United States Patent [19]

Klein et al.

[11] 3,821,723

[45] June 28, 1974

[54] DATA STORAGE CIRCUIT

[75] Inventors: Friedrich Klein, Rothenbach/Peg; Peter Kägeler, Nurnberg, both of Germany

[73] Assignee: Firma DIEHL, Nunberg, Germany

[22] Filed: June 1, 1973

[21] Appl. No.: 366,110

[30] Foreign Application Priority Data

June 2, 1972 Germany............................ 2226991

[52] U.S. Cl............................... 340/173 RC, 333/29

[51] Int. Cl............................................. G11c 21/00

[58] Field of Search................................ 340/173 RC

[56] References Cited

UNITED STATES PATENTS 3,064,241 11/1962 Schneider..................... 340/173 RC 3,405,397 10/1968 Jury.............................. 340/173 RC

*Primary Examiner*—Terrell W. Fears

*Attorney, Agent, or Firm*—Spencer & Kaye

[57] ABSTRACT

A data storage circuit including a plurality of data storage elements and a control circuit for providing address signals, information signals and basic clock pulses. A control clock pulse circuit provides timing pulses to the data storage elements. The frequency of the timing pulses coupled to the data storage elements will be varied such that only those data storage elements which are currently being addressed are operated at the frequency of the basic clock pulses while those data storage elements which are not being addressed are operated by second clock pulses at a lower frequency.

8 Claims, 3 Drawing Figures

PATENTED JUN 28 1974 3,821,723

DATA STORAGE CIRCUIT

BACKGROUND OF THE INVENTION

The present invention relates to a data storage circuit including a plurality of data storage elements, each of which is a circulating memory unit, particularly those constructed in accordance with an MOS technique.

It is becoming increasingly prevalent to construct the data stores used in the calculator art as integrated semiconductor stores. Depending on the type of circuit arrangement employed, especially those constructed in accordance with an MOS process, the energy required for the switching circuits increases with increasing operating frequency. Since it has become highly desirable to operate the memories at increasingly higher frequencies and for the memories to contain a large number of storage locations, it results that large supply currents are required when such semiconductor memories are used. Furthermore, the energy consumed by the switching in the semiconductor memory also produces heat dissipation problems which become more difficult to solve with increasing integration of the circuits.

SUMMARY OF THE INVENTION

An object of the present invention is to provide a data storage circuit in which the above-mentioned difficulties are avoided, or at least substantially reduced.

Another object of the present invention is to provide a data storage circuit which permits a substantial reduction in the energy dissipated in the data store without reducing the operating speed of the memory.

A further object of the present invention is to provide a data storage circuit which presents a relatively low load on the supply current.

A still further object of the present invention is to provide a data storage circuit which can be economically constructed so that it is possible to utilize the data storage circuit of the present invention in small portable table-model calculators.

These objectives are accomplished in accordance with the present invention in that a plurality of data storage elements, each of which is a circulating memory, of the data storage circuit are combined into a group by a common logic circuit to which the appropriate information and address signals are fed and that second clock pulses at a frequency lower than the frequency of the basic operating clock pulses are applied to the data storage elements when they are not being addressed. A control clock pulse circuit is provided in accordance with the present invention for each one of the above-mentioned groups, which circuit applies the basic clock pulse frequency to the data storage elements of the respective group when address signals are present for a specific data storage element of that group and which, when no such address signals are present, applies the second lower frequency clock pulses to the data storage elements of the respective group.

The data storage circuit according to the present invention therefore, operates on the principle that only the data storage element which are selected for a then-occurring write-in or read-out process are applied with the basic clock pulses so as to operate at the operating frequency intended for the memory while all of the other, nonselected, groups of data storage elements are operated at a substantially reduced operating frequency.

If, for example, the operating frequency for the non-selected data storage elements is reduced to one tenth of the normal operating frequency, the energy requirement of the memory can also be reduced, depending upon the size of each group, to approximately one tenth. Thus the temperature difference of the entire memory between the switched-on and switched-off states drops to about 20 to 25 percent of the value compared to a conventionally operated memory.

In a further preferred embodiment of the present invention, the circulating memories are constructed as MOS shift registers with a circulating path connected via the logic circuit.

The present invention includes a further preferred embodiment in which the second, lower frequency clock pulses are derived from the basic clock pulses and the frequencies have a whole number relationship to each other.

The basic clock pulses, the address signals and the information signals are provided by a control circuit. Furthermore, both the information and address signals consist of signal bits and are generated at the same frequency as the basic clock pulses. The information signals are applied to the data storage group during the same period that address signals are applied.

In a further embodiment, the present invention provides synchronization, or word, counters which are associated with each group of data storage elements and which cooperate with the logic circuit in such a manner that they permit switching through of information signals, for write-in or read-out, into or out of the addressed circulating memory of the group only when a new word from the circulating memory passes through the logic circuit. The synchronizing counter advances by one count after the number of clock pulses counted equals the number of bits contained within a word in the circulating memories.

In a preferred embodiment of the data storage circuit according to the present invention, the control clock pulse circuit which controls the operation of the circulating memories of a group includes a frequency divider, an AND gate and an OR gate. The basic clock pulses are applied both to the frequency divider and to one input of the AND gate. The derived clock pulses, i.e. the output of the frequency divider, constitute the second clock pulses and are applied to one input of the OR gate. The address signals are applied to the other input of the OR gate. The OR gate provides, at its input, signals synchronized with either the basic clock pulse or the second clock pulses depending upon whether or not address signals are being applied to the group of data storage elements. The output of the OR gate is connected with the second input of the AND gate. Finally, signals synchronized with either the basic or second clock pulses are generated at the output of the AND gate; these signals are coupled both to the group logic circuit and in parallel to the clock pulses inputs of the individual circulating memories.

A further embodiment of the present invention provides that further clock pulses of a higher frequency, which are derived from the basic clock pulses, are provided during a search phase to the clock pulse inputs of the individual circulating memories and to the respective synchronization counters. With this embodiment of the data storage circuit according to the present invention, it is possible, in the case where a rapid search phase is desired, to increase the clock pulse frequency of the selected shift register group briefly via the basic clock pulse frequency; the extent of this increase is dependent upon the technique selected for manufacturing the semiconductors. The arrangement is capable of tolerating the temporary increase in energy consumption which occurs during such a rapid search phase.

The frequency ratio between the basic clock pulses and the second, lower frequency, clock pulses should be a whole number ratio but may be selected from within wide limits. Especially favorable results are obtained with a ratio of about 8:1 to 10:1.

The number of data storage element per group may vary within wide limits with it being advisable, however, due to economic considerations, to provide at least 10 data storage elements per group. In one practical embodiment of the data storage circuit according to the present invention, 64 shift registers, or data storage elements, were used per group.

DESCRIPTION OF THE PREFERRED EMBODIMENTS

Figure 3:
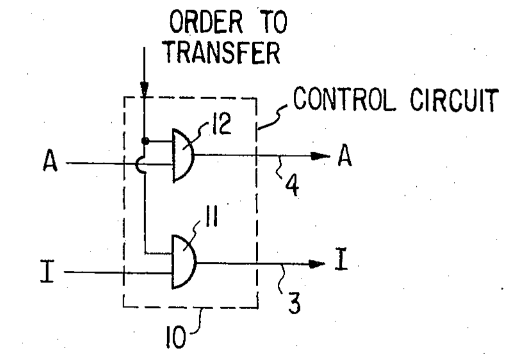
FIG. 3 is a circuit diagramm of the control circuit.
Figure 1:
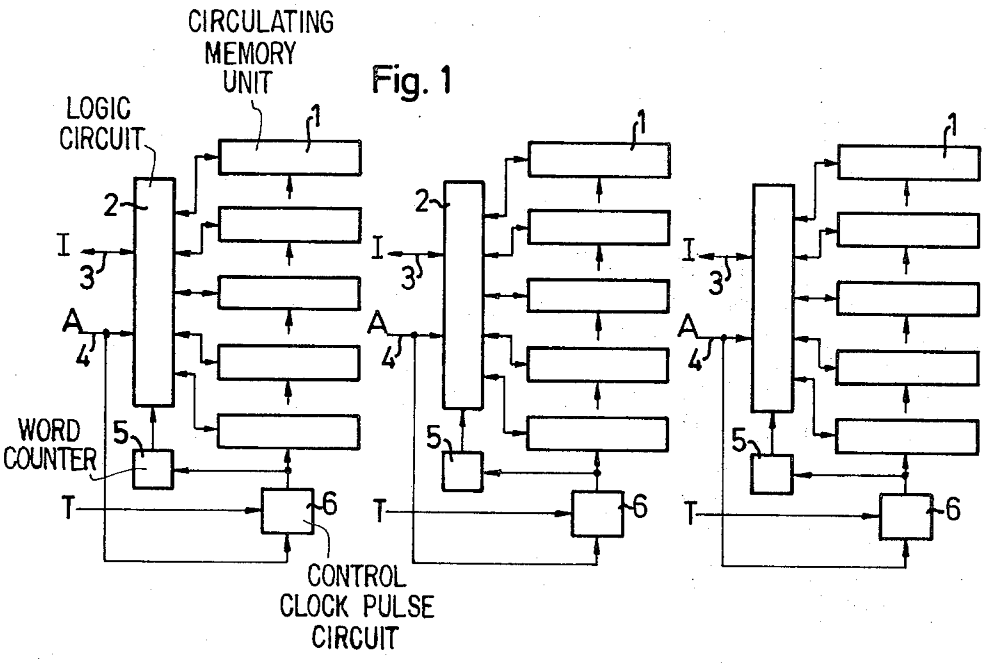
FIG. 1 is a block circuit diagram of a data storage circuit according to the present invention.
Figure 2:
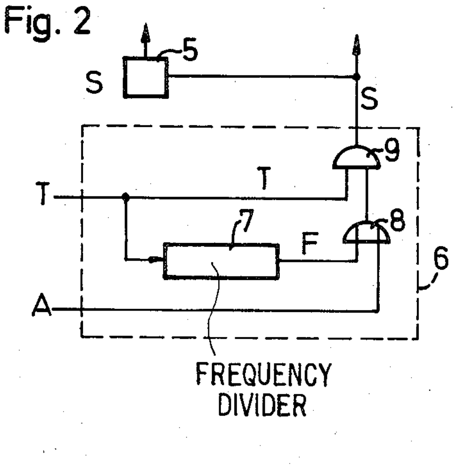
FIG. 2 is a circuit diagram of the control clock pulse circuit shown in FIG. 1 with a schematic representation of its connections to the logic circuit and the data storage elements.

As shown in FIG. 1, the data storage circuit includes a plurality of circulating memory units, 1, which constitute the data storage elements. The circulating memory units, 1, are divided into a plurality of data storage groups. Each of the circulating memory units, which can be an MOS shift register, forms a circulating path which is closed by logic circuit 2. A control clock pulse circuit 6, which is described in detail below in connection with FIG. 2, provides the appropriate time pulses to both the circulating memory units and the logic circuit. MOS shift registers, which can be used in connection with the invention and the manner, how to apply them to circulating memories have been published for instance in the "ML 1405 MOS LSI Shift Register Bulletin 23004" of Microsystems International Ltd, Canada.

In order to simplify the description, only 5 circulating memory units, 1, for each data storage group have been illustrated in FIG. 1. These memory units are connected in parallel to the associated logic circuit 2. Each logic circuit receives, via a first line 3, information signal bits I and, via a second line 4, address signal bits A. These information bits I and address bits A are provided by a control circuit 10 and are synchronized with the basic, or first, clock pulses T. If the invention is used for instance in a computer or a desk calculator, the control circuit 10 is part of the whole control-logic unit of the computer. That control circuit determines corresponding to a respective order, whether the information bits I, read out of the working registers of the computer and the adress bits A, delivered from another part of the logic unit are to be transferred to logic circuit 2. This determination is made by two AND-Gates 11 and 12, to the first inputs of which the order "Transfer" of the computer is fed and to the second inputs of which the information bits I and the adress bits A are fed. If desired, the information bits I also may be read out of any static information memory instead of the working registers. The outputs I and A of the control circuit 10 are in parallel connected to the I and A-inputs of each logic circuit circuit 2.

The writing into and reading out of the circulating memory unit 1 takes place via the logic circuit 2. A synchronization, or word, counter 5 advances its count by one after every passage of a word from the selected memory unit through the logic circuit. Each memory unit, for example, contains 512 bits and since each word has eight bits, there are 64 words stored in a memory unit. Each synchronization counter, therefore, counts up to 64. The synchronization counters are here controlled by the timing pulses which are fed to the logic circuit by the control clock pulse circuit 6. The logic circuit 2 comprises a first decoding circuit for writing information bits I into a circulating memory unit 1, corresponding to the respective address A and it comprises a second decoding circuit for reading out the bits of the circulating memory unit 1. First and second decoding circuits, appropriate for their application to the invention are for instance described in the publication "The Integrated Circuits Catalog for Design Engineers," 2. Unveranderte Auflage, published by Texas Instruments Deutschland GmbH, on pages 9-160, to 9-164 and 9-339 to 9-344.

The control clock pulse circuit 6 provides timing pulses to its associated data storage group and logic circuit. These timing pulses are synchronized with either the basic clock pulses or second clock pulses which are derived from the basic clock pulses. Timing pulses synchronized with these second, derived clock pulses, are continuously applied to a group of circulating memory units as long as the group has not been addressed by the address signals A. Thus the circulating memory units of this group continuously operate at the lower clock pulse frequency and thus consume substantially less energy than during operation at the normal basic clock pulse frequency. Since in the entire data storage circuit usually only one date storage group is addressed at a time, only this group operates at the basic clock pulse frequency while all the other groups operate at the reduced clock pulse frequency. Since in a practical embodiment of the present invention the data storage circuit can be expanded to include $2^{12}$ memory units, and these memory units can be combined, according to the present invention, into groups of 64, the advantages of the data storage circuit of the present invention are evident.

An embodiment of the control clock pulse circuit 6 is schematically illustrated in FIG. 2. A frequency divider 7 is provided at whose input the basic clock pulses T are applied and at whose output the second clock pulses F appear. These second clock pulses are coupled to a first terminal of an OR gate 8 while any address signals being applied to the group are coupled to the second terminal of the OR gate 8. The output of the OR gate is connected to the one input of the AND gate 9, and the basic clock pulses T are applied to the other input of this AND gate.

At the output of the AND gate the timing pulses S are obtained which are coupled to the group logic circuit and in parallel to the clock pulse inputs of the individual memory units of the respective data storage group.

As long as no address signals A are present, both the basic clock pulses T and the second clock pulses F, produced in the frequency divider 7, are applied to the AND gate 9, the second clock pulses F being applied via the OR gate 8. The AND gate 9 is switched through whenever one of the clock pulses F is present and the timing pulses S produced at its output thus has the frequency of the second clock pulse. These timing pulses are coupled to the logic circuit 2 via counter 5 and the synchronization counter, therefore, is also controlled at the second, reduced clock pulse frequency. However, when address signals A are applied to the logic circuit 2 associated with a data storage group which signals are synchronized with the basic clock pulses T, both the clock pulses F at the reduced frequency and the address signals A at the normal basic clock pulse frequency are applied to the OR gate 8. The OR gate 8, therefore, is continuously switched through by the address signals A which are synchronized with the basic clock pulse frequency and, consequently, causes switching through of the series connected AND gate at the same frequency as the basic clock pulses T. Consequently, the circulating memory units 1 of the respective addressed group are operated at the basic clock pulse frequency, the actual operating frequency. The other groups of memory units which have not been addressed continue to operate at the reduced clock pulse frequency. The synchronization counter 5 of the addressed group is thus also synchronized with the basic clock pulse frequency so that the association of the position of the synchronization counter to the beginnings of the words in the shift registers remains in force.

It will be understood that the above description of the present invention is susceptible to various modifications, changes and adaptations, and the same are intended to be comprehended within the meaning and range of equivalents of the appended claims.

We claim:

1. In a data storage circuit having control means for providing address signals, information signals and first clock pulses, the inprovement comprising: a plurality of data storage groups, each of said data storage groups including a plurality of data storage elements, each of which is a circulating memory unit; a plurality of group logic means each connected to said data storage elements of a respective one of said data storage groups and further connected to the outputs of said control means to receive the address signals and the information signals for its respective group; a plurality of clock pulse control means each connected to said data storage elements of one of said data storage groups and connected to said control means to receive the address signals associated with said data storage group and the first clock pulses for providing second clock pulses having a lower frequency than the frequency of the first clock pulses, said clock pulse control means providing timing pulses to each of said data storage elements and said group logic means which are synchronized with the second clock pulses when address signals are not being received by said group logic means and are synchronized with the first clock pulses when address signals are being received by said group logic means.

2. Data storage circuit as defined in claim 1 wherein said circulating memory units are MOS shift registers with a circulating path which is closed by said logic means.

3. Data storage circuit as defined in claim 1 wherein said clock pulse control means provides the second clock pulses in response to the first clock pulses with the proportion between the frequency of the first clock pulses and the frequency of the second clock pulses being a whole number.

4. Data storage circuit as defined in claim 3 wherein the frequency ratio between the first clock pulses and the second clock pulses is 10:1.

5. Data storage circuit as defined in claim 1 wherein each data storage gap includes at least 10 data storage elements.

6. Data storage circuit as defined in claim 1 wherein said control means provides both the information signals and the address signals at a rate synchronized with the first clock pulses.

7. Data storage circuit as defined in claim 6 wherein said control clock pulse means comprises: a frequency divider connected to receive the first clock pulses for providing the second clock pulses; an OR gate having a first input terminal connected to the output of said frequency divider and a second input terminal coupled to receive the address signals associated with the respective one of said data storage groups and providing at its output terminal signals synchronized with either the second clock pulses if there are no address signals present or the address signals if such are present; and an AND gate having a first input terminal connected to receive the first clock pulses, a second input terminal connected to the output terminal of said OR gate, and an output terminal connected to said data storage elements and said group logic means and at which appears pulses synchronized with the pulses at the output terminal of said OR gate.

8. Data storage circuit as defined in claim 1 further comprising a plurality of work counter means each associated with a respective one of said data storage groups, each said word counter means being connected to the output of said control clock pulse means and providing at its output terminal a count signal whose value advances by one count after each receipt of a number of timing pulses corresponding to the number of bits contained in a word in said data storage element, the output terminal of said word counter means being connected to said group logic means of said respective data storage group for enabling switching of the information signals through an addressed one of said data storage elements of said respective data storage group only when a new word from said data storage element passes through said group logic means.

* * * * *